United States Patent [19]

Egner

[11] Patent Number: 4,842,437
[45] Date of Patent: Jun. 27, 1989

[54] THREAD FORMING NUT WITH LOCKING PORTION

[75] Inventor: Ronald J. Egner, Birmingham, Mich.

[73] Assignee: Ryder International Corporation, Arab, Ala.

[21] Appl. No.: 120,863

[22] Filed: Nov. 16, 1987

[51] Int. Cl.[4] .............................................. F16B 1/00
[52] U.S. Cl. .................................. 403/24; 403/406.1; 411/437; 29/432.1
[58] Field of Search ................... 29/432.1, 432.2, 437; 411/437; 403/406.1, 24

[56] References Cited

FOREIGN PATENT DOCUMENTS 1434852  5/1976  United Kingdom ................ 411/437

Primary Examiner—Andrew V. Kundrat
Attorney, Agent, or Firm—R. A. Giangiorgi

[57] ABSTRACT

An improved nut is secured to an unthreaded stud which is inserted through a central bore in the nut. The bore includes a guide means which provides alignment guidance during sliding insertion of the stud into the bore. The guide means preferably has an annular configuration with an inner diameter slightly larger than the diameter of the stud so that the initial insertion of the stud does not produce significant frictional resistance. The bore of the nut further includes a helical thread, preferably a single thread turn, which is disposed in the bore axially distinct from the guide means and terminates within the bore adjacent the guide means. The helical thread has a minor diameter smaller than the stud diameter and also projects radially inwardly into the bore further than the guide means. The cold-forms a mating thread impression into the periphery of the stud and the resulting thread impression obstructs any vibrational retraction of the guide means to promote retention of the nut on the stud.

13 Claims, 2 Drawing Sheets

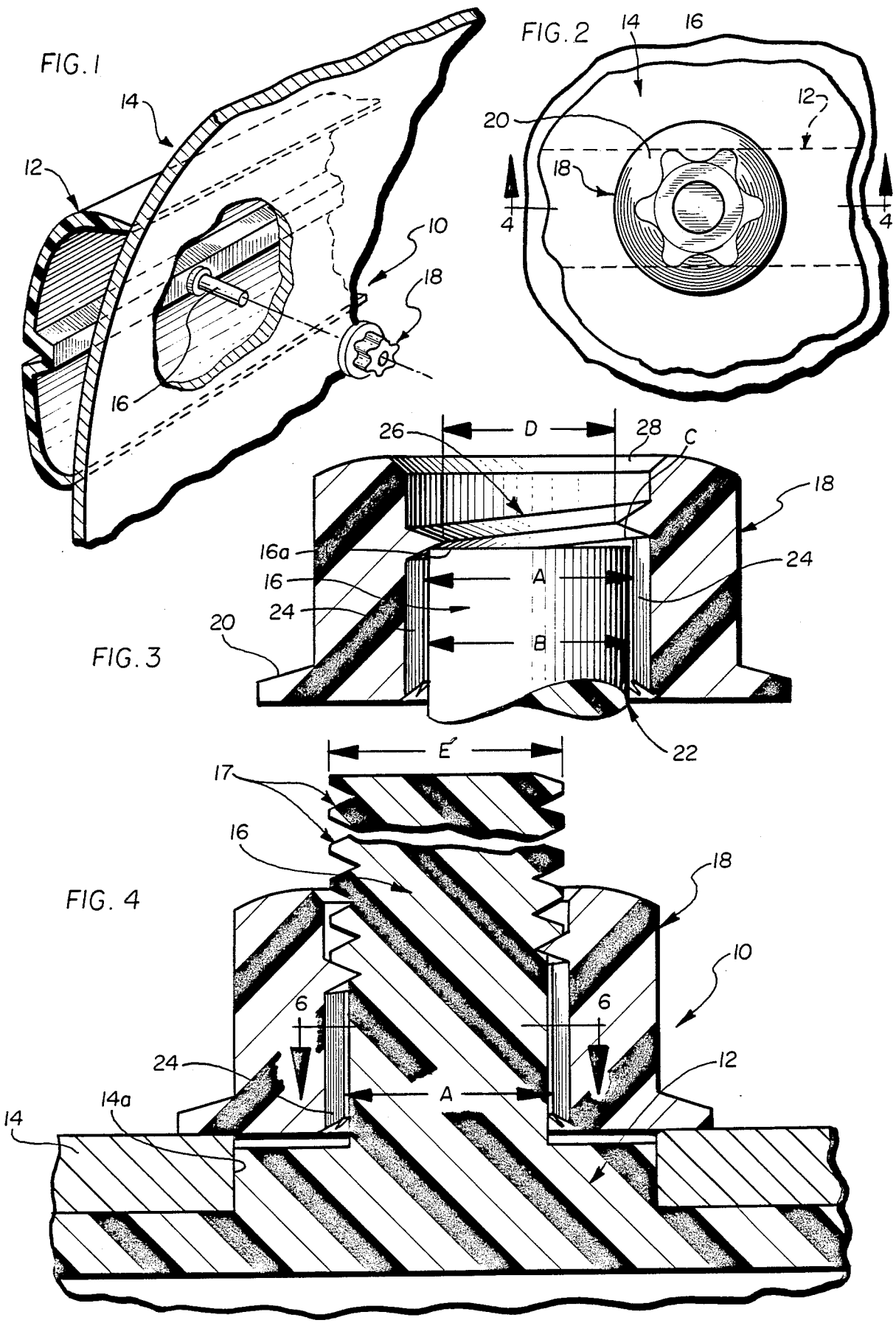

THREAD FORMING NUT WITH LOCKING PORTION

BACKGROUND OF THE INVENTION

This invention relates to fasteners for mounting a work piece on a support member, and further relates to improved fastening nuts which provide locking action for securement upon an unthreaded stud.

In the assembly or erection of structures in which an unthreaded stud is employed to mount a work piece upon a support member, a threaded nut has been conventionally used to cut its own mating thread into the stud as it is driven onto the stud to secure the assemble joint. For example, automotive bumpers have been provided with a protective, resilient "facia strip" which typically includes an elongate stud passing through a hole in the bumper so that a typical metallic hex nut is driven onto the projecting end of the stud to secure the protective strip on the bumper. Typically, the stud is integrally molded with the protective strip from resilient engineering resin, for example, resins commercially available under the Registered Trademark Bexloy from E. I. DuPont. The conventional metal hex nut has a tendency to bind as it is driven onto a plastic stud often resulting in distortion and twisting detachment of the stud so that there is a high frequency of joint failures.

These deficiencies are eliminated by the improved fastening nut and improved joint provided by the present invention.

SUMMARY OF THE INVENTION

The improved nut is secured to an unthreaded stud which is inserted through a central bore in the nut. The bore includes a guide means which provides alignment guidance during sliding insertion of the stud into the bore. The guide means preferably has an annular configuration with an inner diameter slightly larger than the diameter of the stud so that the initial insertion of the stud does not produce significant frictional resistance. The bore of the nut further includes a helical thread, preferably a single thread turn, which is disposed in the bore axially distinct from the guide means and terminates within the bore adjacent the guide means. The helical thread has a minor diameter smaller than the stud diameter and also projects radially inwardly into the bore further than the guide means.

The stud is initially inserted into the bore and slides past the guide formation until it engages the lead of the thread. At this point, torque is applied on the nut and the thread cold-forms a mating thread impression into the periphery of the stud. The resulting thread impression on the stud includes radially outwardly displaced, cold-formed stud material which obstructs any vibrational retraction of the guide means from the stud. The nut is preferably molded from a harder material than the stud which yields to the cold-forming thread of the nut.

In a preferred embodiment of an improved joint employing the nut, the joint structure secures a resilient, protective fascia strip to an automotive bumper. The stud is integrally molded with the fascia strip and is inserted through an aperture in the bumper to expose the projecting end of the stud. The stud end is inserted through the guide means within the bore of the nut. The guide means is defined by an annular pattern of axially aligned teeth with a tooth-to-tooth diameter slightly larger than the peripheral outer diameter of the stud enabling the teeth to provide aligning guidance in sliding the stud into the bore. The nut is molded from a harder plastic than the stud so that the helical thread cold-forms a mating thread impression which obstructs retraction of the teeth to maintain securement of the joint. The major diameter of the nut thread is dimensioned so that the major diameter of the formed stud thread impression is not excessively larger than the inner diameter of the annular tooth pattern so that the nut can be backed off the stud by application of sufficient torque to drive the teeth through the thread impression without stripping or severely deforming the thread impression.

BRIEF DESCRIPTION OF THE DRAWINGS

FIG. 1 is an exploded, perspective view of an embodiment of a joint and fastening nut of the invention;

FIG. 2 is an end view of the assembled joint of FIG. 1;

FIG. 3 is a sectional view in which the unthreaded stud shown in FIG. 1 is partially inserted into the bore of the nut to a point where the end of the stud abuts the nut thread;

FIG. 4 is a sectional view taken along the line 4—4 in FIG. 2, viewed in the indicated direction;

DESCRIPTION OF THE PREFERRED EMBODIMENTS

Figure 5:
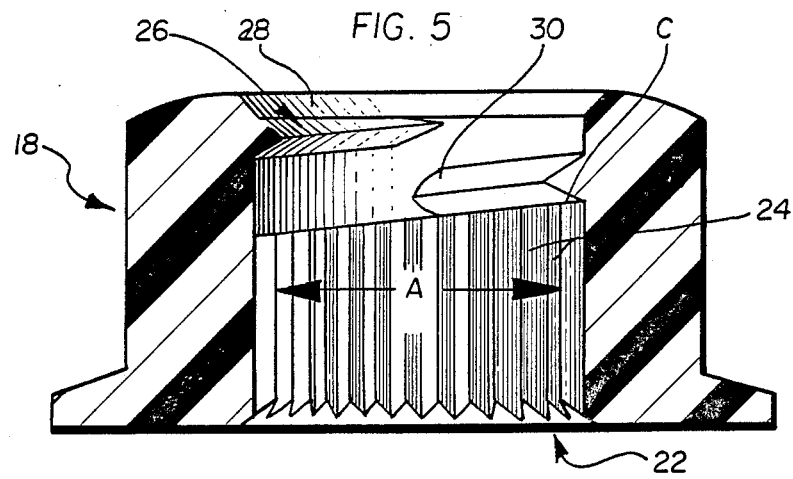
FIG. 5 is a sectional view taken through the nut shown in FIGS. 1-4.

Referring to FIGS. 1-4, an embodiment of an assembled joint according to the present invention is generally designated by referenced character 10. In the illustrated joint 10 a resilient, protective fascia strip 12 molded from engineering resin is mounted on a typical automotive bumper 14. A generally cylindrical unthreaded stud 16 integrally moulded and projecting from the strip 12 is inserted through and projects from a mounting aperture 14a in the bumper 14 as best shown in FIG. 4. A locking nut 18 is then driven onto the stud 16 to secure the joint 10 and the assembly of the strip 12 on the bumper 14.

Figure 6:
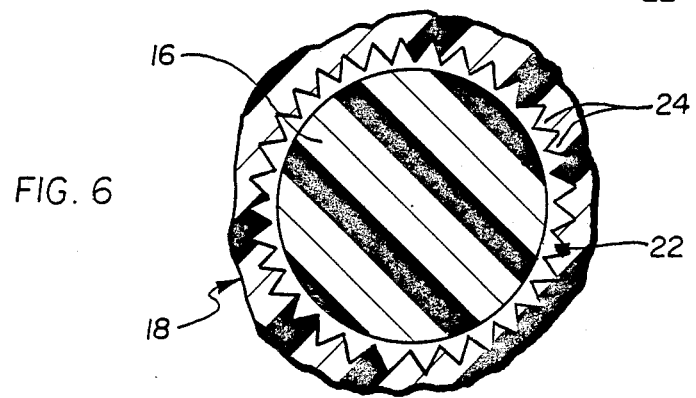
FIG. 6 is a sectional view taken along line 6—6 in FIG. 4, viewed in the indicated direction.

Referring again to FIGS. 1 and 2, the nut 18 preferably has a peripheral profile in a TORX pattern for the advantages in driving the nut. Preferably, the nut 18 also includes a slightly concave flange 20 forming the bearing surface at the pilot or entrance end of the nut 18. The nut 18 has a central, pilot bore 22 which opens at the pilot end adjacent the flange 20 and extends rearwardly through the nut, but terminates within the nut 18 at a medial point between the opposite ends of the nut. As best illustrated in FIGS. 5 and 6, the peripheral wall of the pilot bore 22 is formed by an annular pattern of axially elongate teeth 24 whose apexes are directed radially inwardly. The annular pattern of teeth apexes have an apex-to-apex, or minor diameter designated A which is at least equal to and preferably slightly greater than the diameter B of the stud 16; these relative dimensions of the diameters A and B enable the teeth 24 to provide alignment guidance so that the nut 16 can be inserted through the pilot end of the nut which is slipped over the stud in generally straight relation as shown in FIG. 3, with no significant frictional resistance in the initial operation to mount the nut.

Referring to FIGS. 3-5, the teeth 24 extend the full length of the pilot ore 22 and terminate therewith at a medial depth within the nut at a generally annular location designated C which also corresponds to the terminal, remote end of a single, helical, internal thread turn generally designated 26. The thread turn 26 is generally coaxial with the pilot bore 22 and begins just inside the trailing nut aperture 28 formed by an abbreviated conical counter-bore.

Referring particularly to FIG. 3, the minor diameter D of the thread turn 26 is smaller than the stud diameter B so that when the inserted stud end 16a reaches the medial end C of the teeth 24, the nut 18 is then rotatably driven. The thread 26 interferes with and displaces the peripheral material of the stud to form a mating, external thread impression generally designated 17 into the previously unthreaded stud 16 as shown in FIG. 4. In order to promote the thread forming on the plastic stud with outward displacement of stud material to form the thread impression 17, in contrast to thread cutting and consequent removal of stud material, thread turn 26 can preferrably have a tapered or rounded lead portion 30. For this reason, the stud 18 is fabricated, preferably by molding a harder resin, for example polyoxymethylene such as Delrin R (E. I. DuPont), relative to the plastic composition of the stud which yields to the thread 26. The stud material which is displaced outwardly in forming the thread impression 17 results in a major diameter E which is not only larger than the original stud diameter B, but is also larger than the minor diameter A of the annular pattern of teeth 24 on the nut 18; as a result, the outwardly displaced stud material of impression 17 obstructs the path of retraction of the teeth 24. This obstruction promotes secured retention of the joint 10 by preventing withdrawal of the nut 18 until sufficient torque is deliberately applied to retact the teeth 24 through the obstructing stud impression 17 by a tooled operation to back off the nut. Preferably, the minor diameter D should not be excessively smaller than the minor diameter A of the annular pattern of teeth 24 in order to prevent excessive resistance to retraction of the teeth 24 which could produce stripping or deforming the stud thread impression 17 when the nut 18 is deliberately backed off for removal of the nut from the stud.

The teeth 24 serve dual functions in providing alignment guidance in sliding the nut 18 onto the stud 24 and preventing the nut from becoming misaligned or cocked as the single thread 26 is driven into the stud to form the impression 17; in addition, the teeth 24 also serve as a locking structure which is obstructed from withdrawal in the fully assembled joint 10. This locking feature allows the joint to be maintained without nut retraction, but with low clamping of the nut flange 20 against the bumper 14 to allow tolerance for differences in thermal expansion of the plastic fascia strip 12 (and stud 16) in relation to the typical metallic bumper 14, as well as the hard plastic nut 18.

The nut 18 can be molded by employing separate molding core pins which meet end wise within the mold to respectively form the threaded portion and the toothed, guide bore portion of the central passageway.

Figure 7:
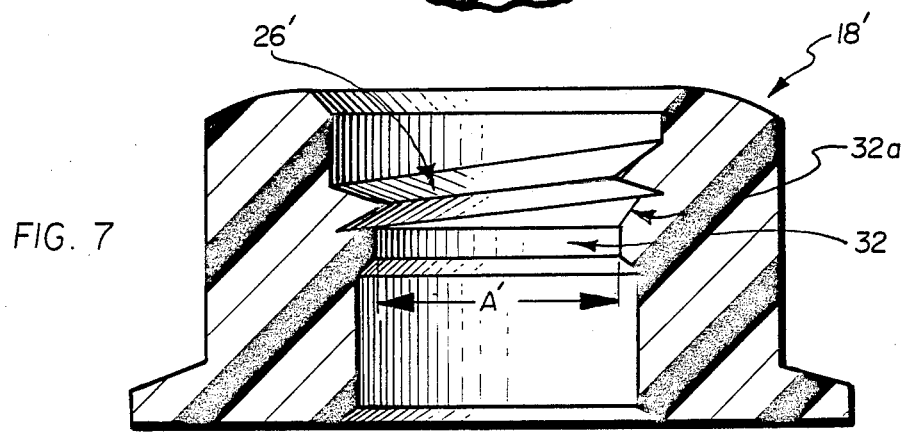
FIG. 7 is a sectional view of a modified nut in accordance with the invention.

Referring to FIG. 7, a modified embodiment of the nut designated 18' includes features similar to those of the nut 18, with the exception that the guide bore 22 prime has a generally smooth, peripheral wall which terminates in an annular ring 32 projecting inwardly into the bore; the ring provides alignment guidance and locking-withdrawal prevention similar to the teeth 24 of the nut 18. Accordingly, the inner diameter of A' of the ring 32 is equal to or slightly greater than the stud diameter B. The length of the ring is governed by provision for sufficient guidance to prevent misalignment in slipping the nut 18' over the stud and maintaining the alignment in driving the thread 26' onto the stud. While the ring 32 must provide sufficient purchase and interference with the stud thread impression to prevent vibrational retraction of the nut 18' and loosening of the joint, the ring can be chamferred at 32a to enable the ring to pass over the stud thread impression 17 with little distortion thereof when the nut 18' is to be removed. To facilitate such removal, the ring 32 can include spaced interruptions governed by the necessary balance between the required locking interference with the stud thread impression relative to the imposed force necessary to back off and remove the nut 18' when desired. Similar modifications of the guide and locking formation can be designed in accordance with the described objectives of the nut and joint.

While particular embodiments of the nut and joint of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A fastening nut for securement to an unthreaded stud, comprising: A nut body having a central through bore, said bore comprising guide formation means projecting radially therein for providing alignment guidance during sliding insertion of said stud into said bore; and a helical thread disposed in said bore axially distinct from said guide means and terminating within said bore adjacent said guide means, said helical thread projecting radially inwardly into said bore further than said guide formation such that sequentially following the sliding insertion of said stud into said bare past said guide formation, said thread engages said stud periphery and cold-forms a mating thread therein, said mating thread including radially outwardly displaced, cold-formed stud material which obstructs relative retraction of said guide means from said stud and thereby promotes secured retention of said nut thereon.

2. A nut according to claim 1, wherein said guide means comprises at least a partial annulus having an inner diameter larger than a minor diameter of said helical thread, said inner diameter being smaller than a major diameter of said helical thread.

3. A nut according to claim 1, wherein said guide means comprises an annular pattern of axially elongate teeth having apexes directed radially inwardly.

4. A fastening nut for securing a molded component such as a bumper rub strip to a mounting surface, as for example, an automobile bumper, wherein said molded component includes an unthreaded stud, of a given diameter "B" and which will extend through an aperture in said mounting surface, said fastening nut comprising: A nut body having a central through bore, said bore comprising guide means for providing alignment guidance during insertion of said stud into said bore, said guide means defining an effective minor internal diameter "A,A'"; and an internal helical thread disposed in said bore axially distinct from said guide means and terminating within said bore adjacent said guide means, said internal helical thread defining a minor thread diameter "D" which is less than the diameter of said stud and said guide means/such that sequentially following the sliding insertion of said stud into said bore past said guide means, said internal helical thread engages said stud periphery and will cold-form a mating external thread therein, said mating external thread being formed by radially outwardly displacing cold-formed stud material, such that said resulting external thread has a major diameter "E" which is greater than the effective internal diameter "A,A'" of said guide means, such that upon retractive movement of the nut from the stud, said guide means will engage said external thread to obstruct and hinder relative retractive moment of the nut from said stud and thereby promotes secured retention of said nut thereon.

5. A nut according to claim 4, wherein said guide means comprises at least a partial annulus having an inner diameter larger than a minor diameter of said helical thread, said inner diameter being smaller than a major diameter of said helical thread.

6. A nut according to claim 4, wherein said guide means comprises an annular pattern of axially elongate teeth having apexes directed radially inwardly which define said effective minor diameter of said guide means.

7. A nut according to claim 4 wherein the material from which said nut is formed is only slightly harder than that of the stud, such that said nut may be unthreaded from said stud, with said guide means deforming the external thread on said stud.

8. A method of securing a molded component such as a bumper rub strip to a mounting surface, as for example an automobile bumper, wherein said molded component includes an unthreaded stud received through an aperture in said mounting surface, said method including the steps of: providing a nut-like member having a central bore including guide-retaining means adjacent the entry end thereof, and defining an effective internal diameter larger than the diameter of the stud, and thread forming means proximate the opposite end of the nut designed to engage and cold-form said stud; engaging said nut over said stud; threading said nut onto said stud and cold-forming an external or male thread into said stud to a major diameter which is greater than the effective internal diameter of said guide-retaining means, continuing to thread said nut onto said stud until said molded component is drawn into engagement with said mounting surface, such that when said engagement is attained said cold-formed external thread will be proximate said guide retaining means, whereby relative retractive moment of the nut with respect to said stud will be resisted due to the interference between said external thread and said guide-retaining means.

9. A method according to claim 8 further including the step of selecting said nut of a material relative to that of the stud such that said nut can be unthreaded from said study, with said guide-retaining means deforming the external thread on said stud during removal.

10. A joint structure for securing a studed work piece such as a bumper facia strip to a support member, as for example a bumper, comprising:

A. a support member having a through passageway therein,
B. a work piece having an elongate stud projecting through said passageway to expose a projecting end therefrom;
C. a securing nut comprising:
  1. a central through bore;
  2. guide means partially defining said bore and located adjacent a leading aperture of the bore, said guide means defining an inner diameter equal to or slightly larger than the peripheral outer diameter of said stud enabling said guide means to provide aligning guidance in sliding said leading bore aperture onto said projecting end of said stud; and
  3. an helical thread disposed in said bore adjacent a trailing aperture thereof, said thread having a minor diameter smaller than said stud diameter and a major diameter larger than said stud diameter and larger than said inner diameter of said guide means; and
D. said stud and nut being fabricated from respective materials of relative hardness such that, after sliding said guide means onto and along said stud, said thread engages said stud periphery and cold-forms a mating thread therein having having a major diameter of outwardly displaced stud material larger than said inner diameter of said nut guide means so that said mating thread obstructs retraction of said nut guide means from said stud and thereby promotes securement of said joint.

11. A fastening nut for securement to an unthreaded stud, said nut comprising; a nut body having a central through bore; internal thread means disposed in said bore; said bore having radially projecting guide means for alignment and guidance of said nut during sliding insertion of said stud into said bore, said guide means comprising at least a partial annulus having an inner diameter larger than the crest diameter of said internal thread means, said internal thread means projecting radially inward of said bore such that the crest diameter thereof is less than said guide means such that sequentially following the sliding insertion of said stud into said bore past said guide means, said internal thread means will engage said stud periphery to cold-form said stud periphery and form therein a mating thread configuration which includes radially outwardly displaced, cold-formed stud material which will have a maximum outer diameter greater than the inner diameter of said guide means and thereby serve to obstruct relative retraction of said nut from said stud and thus promoting securement and retention of said nut on said stud.

12. A nut according to claim 11, wherein said guide means comprises an annular pattern of axially elongate teeth having apexes directed radially inwardly.

13. A joint structure for securing a studded work piece such as a bumper facia strip to a support member, as for example, a bumper, comprising:

A. a support member having a through passageway therein,
B. a work piece having an elongate stud projecting through said passageway to expose a projecting end therefrom;
C. a securing nut comprising:
  1. a central through bore;
  2. guide means radially projecting in said bore, said guide means comprising at least a partial annulus having an inner diameter equal to or slightly larger than the peripheral outer diameter of said stud enabling said guide means to provide aligning guidance during sliding insertion of stud into said bore; and 3. internal thread means disposed in said bore, said internal thread means having a crest diameter smaller than said stud diameter and smaller than said inner diameter of said guide means; and D. said stud and nut being fabricated from respective materials of relative hardness such that, after sliding said guide means onto and along said stud, said internal thread means engages said stud periphery and cold-forms a mating thread configuration therein having a maximum outer diameter of outwardly displaced stud material larger than said inner diameter of said nut guide means so that said mating thread configuration obstruct retraction of said nut guide means from said stud and thereby promotes securement of said joint.

* * * * *

UNITED STATES PATENT AND TRADEMARK OFFICE
CERTIFICATE OF CORRECTION

PATENT NO. : 4,842,437

DATED : June 27, 1989

INVENTOR(S) : Ronald J. Egner

It is certified that error appears in the above-identified patent and that said Letters Patent is hereby corrected as shown below:

Title page, assignee should read --Textron Inc., and Ryder International Corporation, Part interest.--

Signed and Sealed this

Eighteenth Day of June, 1991

Attest:

HARRY F. MANBECK, JR.

*Attesting Officer*  *Commissioner of Patents and Trademarks*